United States Patent [19]

MacAdams et al.

[11] 4,185,067

[45] * Jan. 22, 1980

[54] METHOD OF ROTATIONALLY MOLDING PLASTIC ARTICLES

[75] Inventors: John L. MacAdams, Schaumburg, Ill.; William C. L. Wu, Pittsford, N.Y.; Richard S. Joyner, Rolling Meadows, Ill.

[73] Assignee: Chemplex Company, Rolling Meadows, Ill.

[*] Notice: The portion of the term of this patent subsequent to Jun. 28, 1994, has been disclaimed.

[21] Appl. No.: 509,097

[22] Filed: Sep. 25, 1974

Related U.S. Application Data

[63] Continuation-in-part of Ser. No. 327,577, Jan. 29, 1973, abandoned.

[51] Int. Cl.² .................. B29C 5/04; C08L 23/08
[52] U.S. Cl. ...................... 264/310; 260/897 B; 264/331
[58] Field of Search ...................... 264/310, 331

[56] References Cited

U.S. PATENT DOCUMENTS

| | | | |
|---|---|---|---|
| 3,627,869 | 12/1971 | Walton | 264/310 |
| 3,634,578 | 1/1972 | Suzuki | 264/310 |
| 3,784,668 | 1/1974 | Neidinger | 264/310 |
| 3,974,114 | 8/1976 | Sowa | 264/310 |
| 4,029,729 | 6/1977 | Rees et al. | 264/310 |
| 4,032,600 | 6/1977 | MacAdams et al. | 260/897 |

FOREIGN PATENT DOCUMENTS

| | | | |
|---|---|---|---|
| 798416 | 11/1968 | Canada | 400/91 |
| 1043078 | 7/1965 | United Kingdom | |

OTHER PUBLICATIONS

Dubois and John, *Plastics*, pp. 47–54, (Reinhold Publishing Corporation, 1967).

*Primary Examiner*—Donald J. Arnold
*Attorney, Agent, or Firm*—Wegner, Stellman, McCord, Wiles & Wood

[57] ABSTRACT

A method of rotationally molding blends of polymers of good flow to produce articles of high impact resistance, high stress crack resistance, smooth surfaces, and the absence of excessive warpage in which the blend is placed in a rotational mold which is then biaxially rotated about two perpendicular axes while heating the mold and contents and then cooling the mold and contents to about room temperature while maintaining this biaxial rotation followed by removing the resulting article. The disclosure also includes the rotationally molded shaped structures resulting from this method with these structures having high impact resistance, high stress crack resistance, smooth surfaces and the absence of excessive warpage.

5 Claims, No Drawings

METHOD OF ROTATIONALLY MOLDING PLASTIC ARTICLES

CROSS-REFERENCE TO RELATED APPLICATION

This application is a continuation-in-part of our copending application Ser. No. 327,577, filed Jan. 29, 1973 now abandoned.

BACKGROUND OF THE INVENTION

This invention relates to a process of rotationally molding and the resulting product or article in which a blend of high density polyethylene or ethylene-alkene copolymer and an ethylene-propylene copolymer or terpolymer with diene or a mixture of these two with an EVA copolymer is used.

The most pertinent prior art of which applicants are aware are the following:

U.S. Pat. No. 3,647,922 discloses polyethylene blended with an ethylene-propylene copolymer. However, the blends of this invention and the structures produced therefrom from advantages that are not achieved with the blends of this patent. Thus in this patent the copolymers are block copolymers while the ones here are essentially random as produced via transition metal catalysts. Also the ethylene content of the reference copolymer is low while in the present invention it is high. Additionally, the blends of the reference have low amounts of polyethylene while the blends of this invention have high amounts of polyethylene.

U.S. Pat. No. 3,261,889 discloses a blend of a low density polyethylene and an ethylene-propylene-diene terpolymer to improve environmental stress crack resistance (ESCR). (A table of abbreviations is presented at the end of this specification.) The three component blends of this invention especially have the ESCR improvement significantly above that achieved via a two component blend due to the unexpected synergism of the blend components chosen.

In the conventional rotational molding methods using resins and blends it is customary to use polyethylene of narrow molecular weight distribution and with low melt flow to achieve high impact strength. These prior resins are difficult to process and it appears to be due to their high apparent melt viscosity and they are generally not warp resistant. It has been known to blend EVA (ethylene-vinyl acetate copolymer) with polyethylene in order to improve the impact strength of the resin. However, polyethylene-EVA copolymer blends are not nearly as effective as ethylene-propylene copolymer or ethylene-propylene-diene terpolymer in improving the impact resistance of rotomolded structures. In addition, these prior and conventional rotational molding blends containing polyethylene do not have the above advantages of the blends of this invention.

SUMMARY OF THE INVENTION

The blends useful for this invention that are superior for rotational molding can be generally summarized as being either a high density polyethylene or an ethylene-alkene copolymer containing 3-8 carbon atoms in the alkene group blended with either an ethylene-propylene essentially random copolymer, an essentially random terpolymer of ethylene and propylene and a monomer that is either 1,4-hexadiene, 5-ethylidine-2-norbornene and 5-methylene-2-norbornene, the blend of the polyethylene or ethylene-alkene copolymer and the ethylene-propylene copolymer further blended with ethylene-vinyl acetate, and the blend of the polyethylene or ethylene-alkene copolymer with the above terpolymer and a copolymer of ethylene-vinyl acetate.

Preferred ranges of amounts are 70-95 wt.% of the polyethylene or ethylene-alkene copolymer with 5-30 wt.% of ethylene-propylene copolymer or terpolymer for a total of 100%. In the ethylene-propylene copolymers the preferred proportions are 40-95 wt.% of ethylene and 5-60 wt.% of propylene for a total of 100%. In the terpolymer there is preferably 40-95 wt.% of ethylene, 5-60 wt.% of propylene and 1-8 wt.% of the third monomer listed above so that the total is 100%.

In those blends where ethylene-vinyl acetate copolymers are used the ethylene-vinyl acetate preferably contains 65-95 wt.% of ethylene and 5-35 wt.% of vinyl acetate for a total of 100%. In those blends where ethylene-vinyl acetate is present there is preferably 50-90 wt.% of ethylene or ethylene-alkene copolymer, 5-30 wt.% of ethylene-propylene copolymer or the above described terpolymer and 5-40 wt.% of ethylene-vinyl acetate for a total of 100%.

DESCRIPTION OF THE PREFERRED EMBODIMENTS

The blends of this invention all of which contain polyethylene blended with certain specified copolymers of either two or three monomers have characteristics that make them highly useful for rotational molding to produce molded shaped structures. Thus the blends of this invention have good processability, high impact strength, produce smooth surfaces in the rotationally molded structures with a virtual absence of warpage in the structures, have easy flow during the rotational molding and the structures produced have a high resistance to environmental stress cracking.

The blends of this invention generally contain 50-95 wt.% of high density polyethylene (HDPE) with a preferred composition range of 60-90 wt.%, and either ethylene-propylene copolymer, a terpolymer or ethylene-propylene and a monomer that is either 1,4-hexadiene, 5-ethylidine-2-norbornene or 5-methylene-2-norbornene or either of these copolymers further blended with EVA.

To obtain maximum improvement in the impact strength and ESCR of the blend, the preferred elastomer component, i.e. ethylene-propylene copolymer and ethylene-propylene-diene terpolymer, should have a high molecular weight as measured by the Mooney viscosity and a narrow molecular weight distribution as measured on the Gel Permeation Chromatograph. Tests have shown that the blend properties improve with increasing Mooney viscosity and narrowing molecular weight distribution of the elastomer component of this invention. Furthermore, the blend properties also improve with increasing elastomer content up to the concentration disclosed in this invention.

The following blends of polymers of this invention result in molding resins that have superior rotational molding qualities as discussed above.

1. A blend of 70-95 wt.% of HDPE with 5-30 wt.% of ethylene-propylene copolymer containing 40-95 wt.% of ethylene and 5-60 wt.% of propylene in an essentially random copolymer with a Mooney viscosity (ML1+4/250° F.) of 30 to 100 or in some instances even higher.

2. A blend of 70-95 wt.% of HDPE with 5-30 wt.% of a terpolymer of 40-95 wt.% of ethylene, 5-60 wt.% of propylene and 1-8 wt.% of a termonomer that is either 1,4-hexadiene, 5-ethylidine-2-norbornene or 5-methylene-2-norbornene or blends of these monomers.

3. Blend 1 above further blended with 5-40 wt.% of a copolymer of 65-95 wt.% of ethylene with 5-35 wt.% of vinyl acetate and of an MI range of 0.3 to 30.

4. Blend 2 above further blended with the ethylene-vinyl acetate copolymer of blend 3 in an amount of 5-40 wt.% of a copolymer of 65-95 wt.% of ethylene with 5-35 wt.% of vinyl acetate and of an MI range of 0.3 to 30.

The blends of this invention may be prepared with any desired mixer or blender so long as the resulting blends are homogeneous and therefore uniform. Thus the mixers may be either roll mills, banburies, kneaders or extruders or the like and the mixing temperatures are preferably above the softening point of the ingredients and, for example, may be within the range of 175°-500° F. The blends of this invention are processed in the normal manner in the thermoplastic range of the particular blend to produce shaped structures that are themselves homogeneous and that have desired improved characteristics including those specifically noted above.

Certain values which are important for the proper processing of the blends of this invention are standard procedures that are customarily used in this art. Thus the test for environmental stress cracking of ethylene containing plastics is the test designated D1693-70 of A.S.T.M. The test for impact resistance of plastics is designated as ASTM Method A of D256-56. The standard method used for testing tensile-impact energy to break plastics is designated as ASTM D 1822-68 with the actual test specimen being that shown in FIG. 4B of the paper entitled "Test for Tensile-Impact Energy to Break Plastics" at page 590. Mooney viscosity data is obtained according to ASTM-D1646, Viscosity And Curing Characteristics of Rubber By The Shearing Disc Viscometer.

The high density polyethylene used in this invention includes ethylene homopolymers as well as ethylene butene-1 and ethylene hexene-1 copolymers preferably with an annealed density range of 0.940 to 0.970. These high density polyethylene resins can be produced by Ziegler or modified Ziegler catalysts, chromium oxide catalysts, molybdenum oxide catalysts or any of the available processes for producing essentially linear crystalline polyethylene. The EVA copolymers used in this invention can be produced by free radical catalysts at high pressures. The vinyl acetate content in these copolymers can range from 5% to 35%. The ethylene-propylene copolymers and ethylene-propylene-diene terpolymers used in this invention are essentially random copolymers that can be produced via the transition metal catalyst. The preferred compound should have an ethylene content above 40% with high molecular weight and narrow molecular weight distribution. Where an ethylene-alkene copolymer is used in the blend the alkene content may be up to 10 wt.% of the ethylene-alkene copolymer with the ethylene being from 90-100 wt.%. The preferred alkene groups are those of 3-8 carbon atoms. Thus the individual polymers of the blends of this invention are well known materials.

The three component blends of this invention produce a synergistic effect with relation to the impact strength and ESCR properties of the resin in that the overall effect is greater than that which would be expected by the additive properties of the individual components.

The preferred ethylene-propylene copolymer and ethylene-propylene-diene terpolymer for the three component blend are the same as described above for the two component blend. The preferred ethylene-vinyl acetate copolymer should contain at least 5% vinyl acetate with an MI of 0.1 or above. The blend properties are shown to improve with increasing vinyl acetate concentration up to the preferred range disclosed herein. The processability of the blend on rotational molding machines improves when the polyethylene and the EVA copolymer components have a good match of melt viscosities.

SPECIFIC EXAMPLES

EXAMPLE 1

A blend of 15% ethylene-propylene-diene terpolymer having a Mooney viscosity of about 50 (ML1+4/250° F.) and 85% of ethylene-hexene-1 copolymer of 0.955 density and 18 MI was produced on a Banbury mixer. The mixing times was 3½ minutes, achieving a drop temperature of approximately 320° F. The mixture was dropped into an extruder and pelletized. The resulting blend has a nominal MI of 6.5 and 0.942 density. A comparison of parts rotomolded from this blend and other commercial rotomolding resins under the same molding conditions show that the blend of this example is characterized by excellent impact strength and dimensional stability (very low warpage) plus smooth glass-like interior surfaces and an unusually wide range of molding temperature and cycle times.

EXAMPLE 2

A nominal 0.96+density and 6.0 MI blend of high density polyethylene was made under similar conditions as in Example 1. The rotomolded parts from this resin show very poor dimensional stability (warpage was so bad that the part was useless), very rough interior surface, and very low resistance to tear.

EXAMPLE 3

A comparison between the physical properties of rotomolded parts from the blend in Example 1 and a direct synthesis copolymer rotomolding resin is shown in Chart I.

| CHART I<br>Physical Properties of Rotomolded Parts | | |
|---|---|---|
| | Blend in Ex.1 | HDPE Copolymer Rotomolding Resin |
| MI (g/10 min) | 7.1 | 4.5 |
| Density (g/cc) | 0.936 | 0.935 |
| Tensile Impact (ft-lbs/in$^2$) | 64 | 21 |
| Notched Izod (ft-lbs/in width) | 4.6(P) | 0.81(C) |
| Bell ESCR F$_{50}$ (hrs) | 4.3 | break on bending |

The above results indicate that the blend of this invention has significantly better properties on rotomolded structures than that of HDPE copolymer resins with similar MI and density properties but produced by direct synthesis.

EXAMPLES 4-8

The effect of EPDM rubber concentration on the physical properties of the plaques compression molded from these blends is shown in Chart II. The materials and mixing conditions are the same as in Example 1.

CHART II
Effect of EPDM Concentration

| Ex. | EPDM Conc. | MI (g/10 min) | Density (g/cc) | Tensile Impact (ft-lbs./in$^2$) | Notched Izod (ft-lbs./in width) |
|---|---|---|---|---|---|
| 4 | 0 | 18 | 0.955 | 35 | 0.8(C) |
| 5 | 5% | 14 | 0.951 | 37 | 0.83(C) |
| 6 | 10% | 9.6 | 0.948 | 47 | 1.2(C) |
| 7 | 12.5% | 9.0 | 0.944 | 46 | 2.0(H) |
| 8 | 15% | 5.6–6.7 | 0.941–3 | 61–80 | 4.4-NB |

The above results indicated improved impact properties as the EPDM content of the blend was increased.

EXAMPLE 9

A blend of 10% ethylene-propylene-diene terpolymer with 20% 0.950 density, 2.5 MI, 27.6% vinyl acetate content EVA copolymer plus 70% of a 0.964 density, 12 MI homopolymer polyethylene was produced on a Banbury mixer and pelletized as in Example 1. Rotomolded parts from this nominal 5.5 MI, 0.953 density blend were characterized by excellent impact resistance and superior ESCR (about 60 hours). The impact strength and especially the ESCR are the result of a synergistic effect between the EPDM and the EVA copolymer. Chart III shows this effect for compression molded samples.

EXAMPLE 10

A blend of 30% EPDM and 70% homopolymer is prepared using the same materials and procedures as in Example 9. Physical properties of compression molded plaques are shown in Chart III.

EXAMPLE 11

A blend of 30% EVA copolymer and 70% homopolymer polyethylene is prepared using the same materials and procedures as in Example 9. Physical properties of compression molded plaques are shown in Chart III hereinafter.

EXAMPLES 12-20

The effect of EPDM and EVA concentration on the physical properties of compression molded plaques from the resulting blends is shown in Chart IV hereinafter. The materials and mixing conditions are the same as in Example 9 except that the hexene copolymer used in Example 1 was used in place of the homopolymer used in Example 9. This data also shows the synergistic effect of the EVA-EPDM combination.

CHART III
Synergistic Effects

| Ex. | Concentration Wt. % PE | EPDM | EVA | MI (g/10 min) | Density (g/cc) | Notched Izod (ft-lbs/in. width) | Tensile Impact (ft-lbs./in.$^2$) | Bell ESCR $F_{50}$ (hrs) |
|---|---|---|---|---|---|---|---|---|
| Control | 100 | — | — | 12 | 0.96+ | 0.8(C) | 35 | — |
| 9 | 70 | 10 | 20 | 5.8 | 0.956 | N.B. | 130 | 264 |
| 10 | 70 | 30 | — | 2.5 | 0.940 | N.B. | 136 | 58 |
| 11 | 70 | — | 30 | 9.5 | 0.960 | 2.0(C) | 77 | 2.0 |

CHART IV
Effect of EPDM and EVA Concentration
Synergistic Effects

| Ex. | Concentration Wt. % PE | EPDM | EVA | MI (g/10 min) | Density (g/cc) | Notched Izod (ft-lbs/in. width) | Tensile Impact (ft-lbs/in.$^2$) | Bell ESCR $F_{50}$ (hrs) |
|---|---|---|---|---|---|---|---|---|
| 12 | 100 | — | — | 18 | 0.955 | 0.8(C) | 35 | — |
| 13 | 90 | 10 | — | 9.6 | 0.948 | 1.2(C) | 47 | — |
| 14 | 85 | 15 | — | 5.6–6.7 | 0.941–43 | 4.4-N.B. | 61–80 | 4.3–16 |
| 15 | 85 | — | 15 | 15 | 0.954 | 1.2(C) | 71 | 4.4 |
| 16 | 80 | 20 | — | 4.8–5.9 | 0.938–41 | N.B. | 76–80 | 24 |
| 17 | 80 | — | 20 | 11 | 0.950 | N.B. | 60 | 43 |
| 18 | 70 | 30 | — | 2.8 | 0.930 | N.B. | 105 | 94 |
| 19 | 70 | — | 30 | 11 | 0.952 | 3.0(P) | 81 | 82 |
| 20 | 70 | 10 | 20 | 5.4 | 0.943 | N.B. | 93 | >3000 |

EXAMPLE 21

66.5% of a 0.964, 12 MI homopolymer polyethylene is blended with 28.5% of a 1 MI, 0.930 density, 9% vinyl acetate content EVA copolymer and 5% of an ethylene/propylene/1,4-hexadiene monomer rubber using the same conditions as in Example 1. Rotomolded parts from this resin show improved impact strength over rotomolded parts from the blend in Example 1.

In the rotational molding process of this invention the mold may be rotated at from about 2–12 rpm about the major axis and about 5–40 rpm about the minor axis although the conditions for rotomolding any blend of polymers within the method of this invention can be easily determined by those skilled in the art of rotational molding. Thus, for example, in the rotomolding of the resins of Chart I above the mold was rotated for 13 minutes at 10 rpm about the major axis and 11.4 rpm about the minor axis while the mold was heated at about 650° F. At the end of the 13 minutes the mold and contents was transferred to a cooling chamber that was cooled by water and air for 7 minutes to approximately room temperature and the resulting molded article was then removed from the mold. As a general statement it can be noted that a practical range of temperatures may be from 400°–900° F.

All parts and percentages herein are by weight.

Abbreviations

EPDM: ethylene propylene diene monomer
ESCR: environmental stress crack resistance
EVA: ethylene-vinyl acetate
HDPE: high density polyethylene
MI: melt index
MWD: molecular weight distribution Having described our invention as related to the embodiments set out herein, it is our intention that the invention be not limited by any of the details of description, unless otherwise specified, but rather be construed broadly within its spirit and scope as set out in the appended claims.

We claim:

1. The method of rotationally molding articles of high impact resistance, high stress crack resistance, with smooth surfaces and an absence of excessive warpage, comprising: placing in a rotational mold a blend comprising a three component blend of (1) 60–80 wt.% of a member of a first class consisting of high density polyethylene and high density ethylene-alkene copolymers containing 4 to 6 carbon atoms in the alkene group blended with (2) 5–20 wt.% of a member of a second class consisting of ethylene-propylene essentially random copolymer and an essentially random terpolymer of ethylene-propylene-monomer in which the monomer is selected from the group consisting of 1,4-hexadiene, 5-ethylidine-2-norbornene and 5-methylene-2-norbornene, and (3) 5–30 wt.% of a copolymer of ethylene-vinyl acetate for a total of 100%; biaxially rotating the mold about two perpendicular axes while heating the mold and contents within the range of about 400°–900° F.; cooling said mold to about room temperature while maintaining said coaxial rotation; and removing the resulting rotationally molded article.

2. The method of claim 1 wherein said component (2) consists essentially of a said ethylene-propylene copolymer containing 40–95 wt.% of ethylene and 5–60 wt.% of propylene for a total of 100%, and said component (3) contains 65–95 wt.% of ethylene and 5–35 wt.% of vinyl acetate for a total of 100%.

3. The method of claim 1 wherein component (2) consists essentially of a said terpolymer containing 40–95 wt.% of ethylene, 5–60 wt.% of propylene and 1–8 wt.% of said group monomer for a total of 100%, and said ethylene-vinyl acetate copolymer contains 65–95 wt.% of ethylene and 5–35 wt.% of vinyl acetate for a total of 100%.

4. A method of rotationally molding articles of high impact resistance, high stress crack resistance, with smooth surfaces and an absence of excessive warpage, comprising: placing in a rotational mold a blend comprising a three component blend of 70 wt.% of high density polyethylene as a first component, 10 wt.% of ethylene-propylene essentially random copolymer as a second component and 20 wt.% of ethylene-vinyl acetate as a third component; biaxially rotating the mold about two perpendicular axes while heating the mold and contents within the range of about 400°–900° F.; cooling said mold to about room temperature while maintaining said coaxial rotation; and removing the resulting rotationally molded article.

5. A method of rotationally molding articles of high impact resistance, high stress crack resistance, with smooth surfaces and an absence of excessive warpage, comprising: placing in a rotational mold a blend comprising a three component blend of 70 wt.% of high density polyethylene as a first component, 10 wt.% of ethylene-propylene-monomer essentially random terpolymer as a second component and 20 wt.% of ethylene-vinyl acetate as a third component; biaxially rotating the mold about two perpendicular axes while heating the mold and contents within the range of about 400°–900° F.; cooling said mold to about room temperature while maintaining said coaxial rotation; and removing the resulting rotationally molded article.

* * * * *